(No Model.)
W. H. GRAY.
CIRCULAR SAWING MACHINE.
No. 314,667. Patented Mar. 31, 1885.
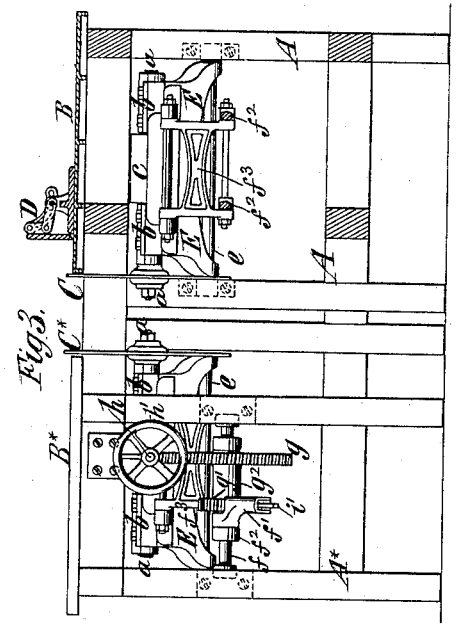
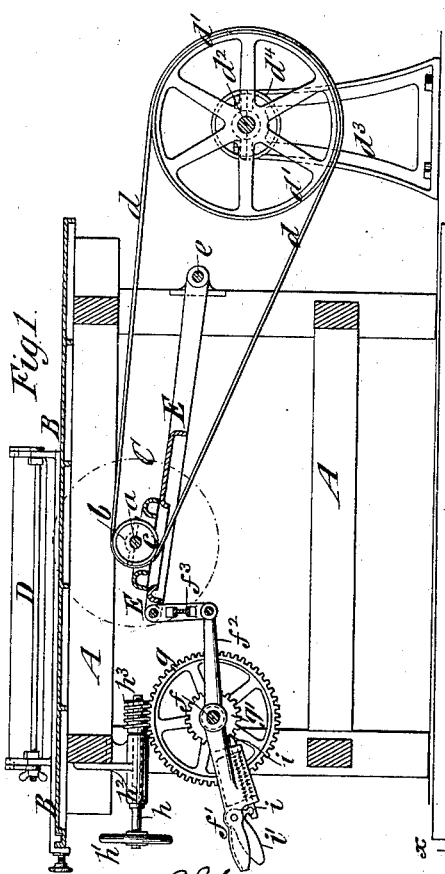
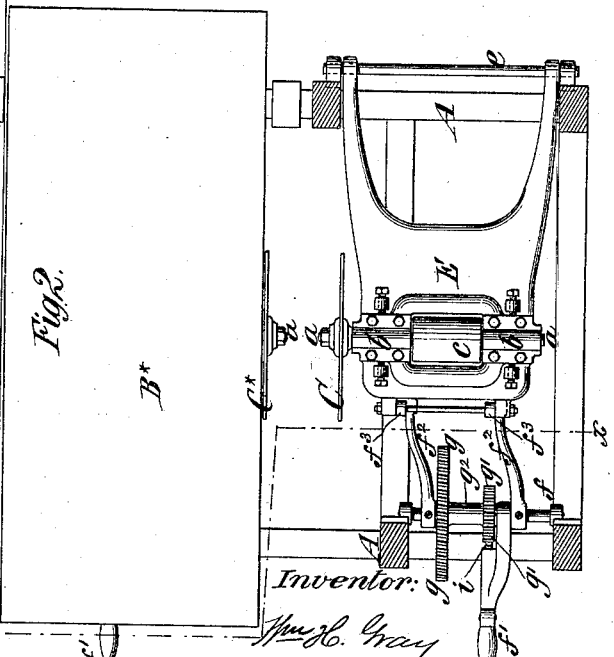
Witnesses:
Inventor: Wm. H. Gray
by his Attys. Brown & Hall

UNITED STATES PATENT OFFICE.

WILLIAM H. GRAY, OF BROOKLYN, NEW YORK, ASSIGNOR TO THE GLEN COVE MACHINE COMPANY, LIMITED, OF SAME PLACE.

CIRCULAR SAWING MACHINE.

SPECIFICATION forming part of Letters Patent No. 314,667, dated March 31, 1885.

Application filed February 2, 1885. (No model.)

*To all whom it may concern:*

Be it known that I, WILLIAM H. GRAY, of Brooklyn, (Green Point,) in the county of Kings and State of New York, have invented a new and useful Improvement in Circular-Saw Tables, of which the following is a specification.

My invention relates to circular-saw tables in which the saw arbor or mandrel is supported by vertically-moving bearings or a vertically-swinging frame, which may be moved upward and downward to regulate the protrusion of the saw above the table or to remove it entirely below the table.

The invention is applicable to saw-tables in which there is but a single saw, but its advantages are more apparent in double saw-tables having both a slitting-saw and a cutting-off saw, either of which is lowered out of the way and below the table when the other is to be used.

Heretofore a saw arbor or mandrel has been mounted on a swinging frame, and the same has been raised and lowered by means of a screw or racks and pinions. I preferably employ such a frame and make no claim thereto, broadly; but the object of my invention is to provide a simple and reliable combination of mechanism, whereby the movable bearings or swinging frame and the saw supported thereby may be raised and lowered rapidly to bring it above or below the table, and then moved more slowly to adjust accurately the extent to which the saw protrudes above the table.

The invention will be hereinafter described, and pointed out in the claims.

In the accompanying drawings, Figure 1 is a vertical section of a saw-table embodying my invention. Fig. 2 is a plan of a double saw-table embodying the invention, the top of one table, or one part of the double table, being removed to expose the parts beneath; and Fig. 3 is a vertical section on the plane of the dotted line $x\,x$, Fig. 2.

Similar letters of reference designate corresponding parts in all the figures.

A A* designate the frame of the double table, and B B* designate the tops thereof.

C C* designate two saws, the first of which may be a slitting-saw, its table having attached to it a gage, D, and the second of which, C*, may be a cutting-off saw.

A description of the operating mechanism of one saw applies equally to either. The saw C or C* is secured on a mandrel or arbor, $a$, mounted in bearings $b$ and carrying a pulley, $c$. Each saw will be driven by a belt, $d$, passing around a pulley, $d'$, on a counter-shaft, $d^2$, and driving onto the pulley $c$. The counter-shaft $d^2$ is mounted in bearings in standards $d^3$, and may be driven by a belt driving onto the pulley $d^4$. The bearings $b$ of each saw-arbor are carried by or mounted on a frame, E, pivoted or fulcrumed at $e$ to swing in a vertical plane, and by swinging such frame the saw will be exposed above or shielded below the table. At the front of the table is a short shaft, $f$, free to turn in bearings, and on this shaft are secured a handle or lever-arm, $f'$, for turning it, and another arm, or, as here shown, two arms, $f^2$, which are connected by a link or connection, $f^3$, with the free or front end of the swinging frame E. This link or connection may be of cast-iron and broad enough to extend between and connect both arms $f^2$ with the swinging frame E.

From the above description it will be understood that by raising or lowering the handle $f'$ the shaft $f$ will be turned and the frame E with its supported saw raised or lowered. The means here represented for holding the frame E will now be described. On the shaft $f$ is a spur or worm wheel, $g$, and a notched disk or wheel, $g'$, connected by a sleeve, $g^2$, so that neither can turn without the other. This system of wheels can, however, turn freely on the shaft $f$. Projecting at the front of the table is a shaft, $h$, having a hand-wheel or handle, $h'$, whereby it may be turned in a bearing, $h^2$, and having fast upon it a worm or screw, $h^3$, which gears into the wheel $g$, and thereby provides for turning said wheel when desired. This screw also serves to secure said wheel against turning accidentally. Upon the handle or hand-lever $f'$ is arranged a spring-actuated locking-bar, $i$, which engages with the notches of the wheel or disk $g'$, and may be withdrawn therefrom by a pivoted hand-piece, $i'$, arranged adjacent to the handle $f'$. The construction of these parts is similar to that of an engine-reversing lever, and will be well understood from Fig. 1. By unlocking the hand-lever $f'$ from the disk or wheel $g'$ the said lever may be manipulated to raise and lower the frame E, and thereby to expose the saw for use, or withdraw the saw below the top of the table. The swinging frame may be raised or lowered rapidly, to bring the saw into a position for use or remove it from such position, and will then be held against falling by the locking-bar $i$ engaging with the notched disk $g'$. If, now, it be desired to accurately adjust the height or amount of protrusion of the saw above the table, the shaft and worm $h\ h^3$ may be turned more or less in one direction or the other.

Inasmuch as the lever-arms $f^2$ are connected with the free end of the swinging frame E, they are indirectly connected with the bearings of the saw-arbor.

What I claim as my invention, and desire to secure by Letters Patent, is—

1. The combination, with a saw-arbor and bearings therefor, movable to expose or shield the saw, of a shaft and handle, whereby it may be turned, arms extending from said shaft and connected with the arbor-bearings, a notched disk loose on said shaft and a locking device on the said handle engaging with said disk, and a worm and worm-wheel, whereby the said disk and its locked handle may be turned or adjusted, substantially as herein described.

2. The combination, with a saw-arbor and a swinging frame, E, pivoted at its rear end and carrying said arbor, of a shaft or pivot, $f$, provided with arms $f^2$, and a connection, $f^3$, whereby said arms are connected with the free end of the frame E, a lever or handle, $f'$, on the shaft or pivot $f$, and by which the frame with its saw-arbor may be raised and lowered, and locking devices, substantially such as described, for holding the lever or handle $f'$ in different positions to which it is adjusted, all substantially as herein set forth.

3. The combination, with the swinging frame E, pivoted at its rear end, and the saw-arbor $a$, carried thereby, of the shaft $f$ and its lever or handle $f'$, arms $f^2$, fast on said shaft, and a connection, $f^3$, between said arms and the free end of said frame E, the worm-wheel and notched disk $g\ g'$, the worm $h^3$, engaging with the wheel $g$ for turning it and said disk, and the locking-bar $i$, carried by the lever or handle $f'$ and engaging with the notched disk $g'$, all substantially as herein described.

WM. H. GRAY.

Witnesses:
HENRY S. OLDRING, Jr.,
J. W. FRASER.